United States Patent
Jakway et al.

[11] 3,936,277
[45] Feb. 3, 1976

[54] ALUMINUM ALLOY-BORON FIBER COMPOSITE

[75] Inventors: William M. Jakway, Creve Coeur; Ronald B. Kollmansberger, Florissant, both of Mo.

[73] Assignee: McDonnell Douglas Corporation, St. Louis, Mo.

[22] Filed: Apr. 9, 1970

[21] Appl. No.: 26,966

[52] U.S. Cl. .................. 29/191.6; 29/195; 29/197; 228/155; 228/194; 228/195; 228/249
[51] Int. Cl.²..................... B32B 15/14; B32B 35/20
[58] Field of Search.................... 29/191.6, 195, 197

[56] References Cited
UNITED STATES PATENTS

| | | | |
|---|---|---|---|
| 2,100,258 | 11/1937 | Larson................................. | 29/197 |
| 2,583,163 | 1/1952 | Wasserman...................... | 29/197 X |
| 3,427,185 | 2/1969 | Cheatham et al.............. | 29/191.6 X |
| 3,469,952 | 9/1969 | Baker............................. | 29/191.6 X |
| 3,473,900 | 10/1969 | Sara...................................... | 29/195 |
| 3,476,529 | 11/1969 | Dubin et al..................... | 29/191.2 X |
| 3,480,411 | 11/1969 | Pryor............................... | 29/197 X |
| 3,547,180 | 12/1970 | Cochran......................... | 29/191.2 X |

OTHER PUBLICATIONS

R. K. Robinson, *Fiber Reinforced Metal Matrix Composites,* in AEC Accession, No. 4988, Report No. BNWL–SA–550, (1966), (only pp. 1, 6, 13, 17, 18 relied on).

*Primary Examiner*—Allen B. Curtis
*Attorney, Agent, or Firm*—Charles B. Haverstock

[57] ABSTRACT

Fiber reinforced metal sheets coated with an alloying material for use in forming fiber reinforced metal matrix composite structures by means of eutectic bonding processes and the structures formed by said sheets.

3 Claims, 5 Drawing Figures

U.S. Patent  February 3, 1976  3,936,277
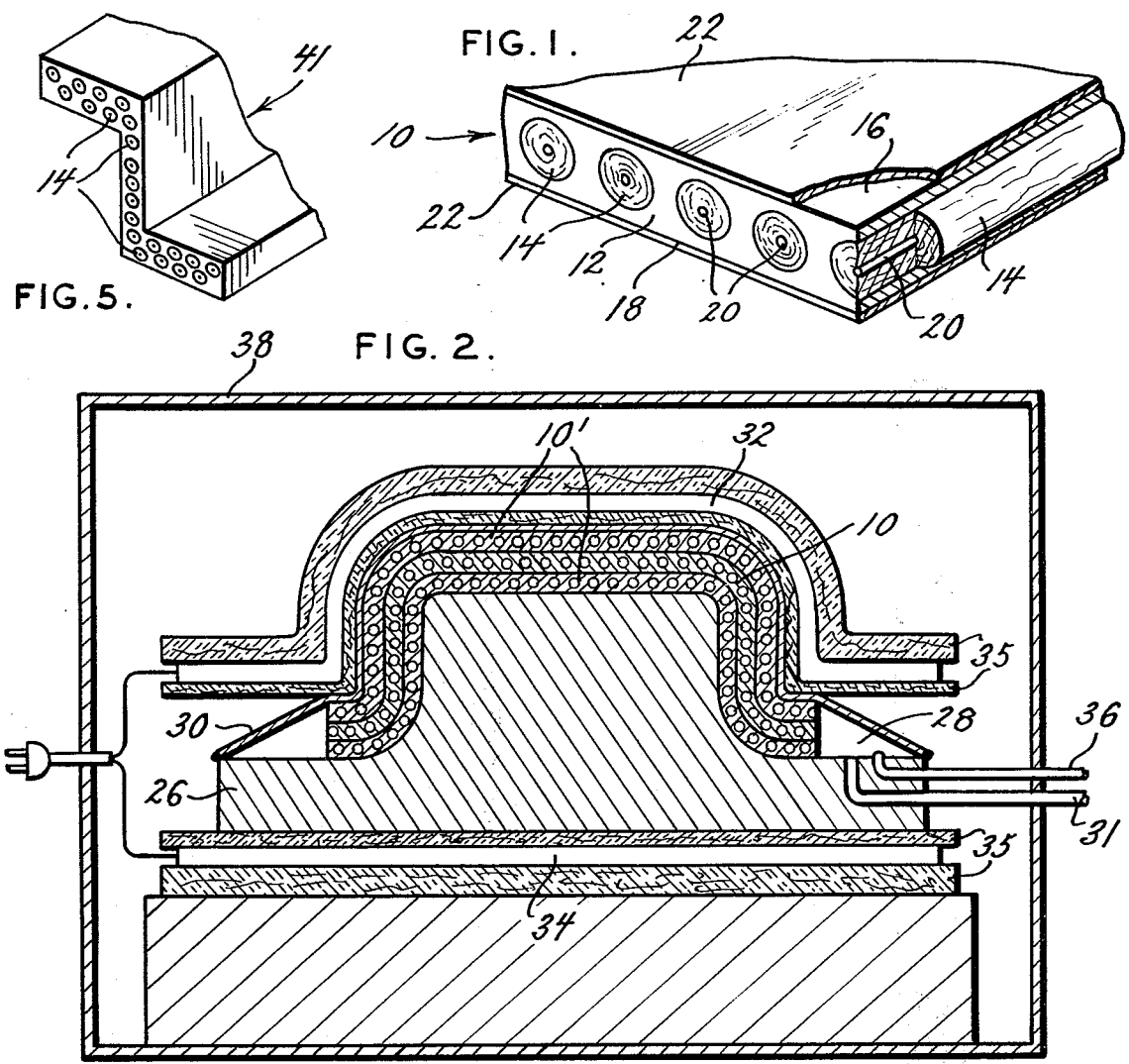
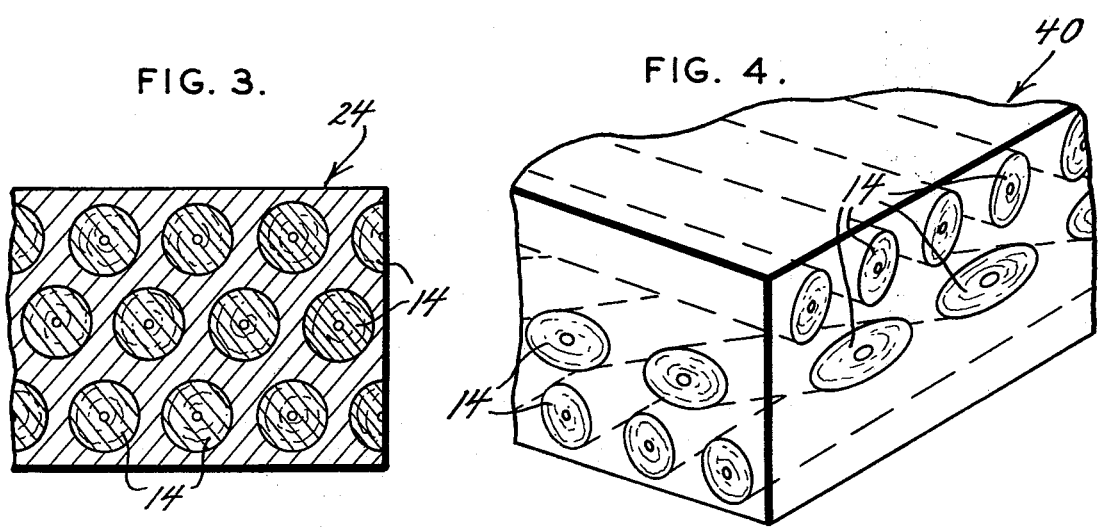

ALUMINUM ALLOY-BORON FIBER COMPOSITE

Fiber reinforcement with materials such as boron fibers or filaments has become an increasingly attractive way to add strength and rigidity to metal parts especially aluminum metal parts, without increasing, and in some cases even reducing, the weight of the parts. This is especially important in the aerospace industries where methods for increasing the strength to weight and modulus to weight ratios of compressor blades, skins, spars, ribs longerons and other primary structures are constantly being sought. Unfortunately, heretofore high material costs and difficult and costly fabrication procedures have severely limited utilization of fiber reinforced metal composite structures to small and/or highly critical parts or to parts which are substantially flat in shape. This is so because the primary fabrication processes that have been used to manufacture such composite structures have been diffusion or solid state bonding processes which by their very nature require that extremely high pressures be applied to the structures during bonding. The high diffusion bonding pressures required heretofore, typically in the range from about 6,000 to about 80,000 psi, have limited the size of parts which can be formed because such high pressures are difficult to obtain and maintain uniformally over large surface areas, and the use of higher temperatures to allow lower pressures would result in detrimental fiber-matrix interaction. Diffusion bonding is also time consuming, not adaptable to high production rates, and under certain circumstances induces warpage into the members being fabricated. In addition, where parts other than flat sheets have been fabricated, it has been necessary to use high temperature creep forming processes and to leave the fibers out of the metal altogether in regions where bending is required. High temperature creep forming is very costly and so difficult to control that many rejects and wasted parts result therefrom. Also the deletion of fibers from regions of the composite sheets in which the bends are to be made greatly increases the cost of their production and substantially reduces the overall strength of the finished members as compared to the strength of similar members having fibers located in them where they have bends. Furthermore, metal matrices heretofore commonly used for fiber reinforced metal composite structures have been relatively low ductility, high strength alloys which for the most part are not as ductile for forming operations as is sometimes desirable even neglecting the effect of the fibers.

The present invention in part resides in the construction and use of fiber containing sheets, tapes, or foils which can be produced in standard thicknesses of either monolayer or multi-layer construction with the desired fiber orientation and then be used as an intermediate product to produce composite members of just about any size, shape, or thickness. In addition, by careful orientation of the subject sheets, composite structures can be produced whose tensile strength and/or stiffness varies differently in different directions and/or portions of the member. The subject sheets, of which any desired number can be used in a single structure, are eutectically bonded together to form the detail parts, structural elements, integrally stiffened panels and/or during construction of a composite structure and during the bonding process an alloying agent which is used in the eutectic bonding process is diffused throughout the metal matrix material to change the parent or base metal of the sheets from a relatively low strength, ductile material to a relatively strong, less ductile alloy. Since the subject sheets can be produced in standard thicknesses with the fibers relatively uniformly distributed throughout a ductile, low strength matric metal, the production of such sheets is anticipated to be relatively economical and therefore the overall cost of composite structures constructed therefrom will be reduced in relation to the cost of other comparable structures. Also, since the subject sheets are constructed to allow eutectic bonding therebetween rather than diffusion or solid state bonding, and since the individual sheets themselves are relatively flexible and ductile before being bonded, a fiber reinforced composite member such as materials, structural elements, assemblies, parts, even one having a relatively complex shape, can be built by merely stacking a plurality of the subject sheets on, in or over a mold or form of the desired shape and bonding them together. The temperatures and pressures involved in such an eutectic bonding process are relatively low and can be easily obtained and maintained in economical and easy to operate means such as in autoclaves. This means that relatively large and complex shaped members can be constructed at relatively high production rates because the bonding time is comparable to welding and brazing and at relatively low cost with the present invention as compared to all known processes and techniques.

It is therefore a principal object of the present invention to provide improved means and methods for fabricating fiber reinforced metal matrix composite members.

Another object is to provide means for constructing stronger and more rigid structural members.

Another object of the present invention is to provide means which enable construction of fiber reinforced metal composite structures having relatively complex shapes.

Another object is to provide means which enable construction of fiber reinforced metal matrix composite structural members having unequal thickness parts by the relatively simple means of adding layers as required.

Another object is to reduce the cost of constructing fiber reinforced metal composite structures.

Another object is to provide an improved fiber reinforced metal sheet which is particularly useful as an intermediate product in the fabrication of fiber reinforced metal alloy composite structures.

Another object is to provide an improved process for bonding together metal sheets having reinforcing fibers therein.

Another object is to provide a process for changing a relatively low strength matrix metal into a high strength matrix alloy.

Another object is to provide an improved process whereby the parent or base metal is alloyed to a heat treatable alloy by an agent used in the eutectic bonding process.

Another object is to increase the strength-to-weight and modulus-to-weight ratios of structural members.

Another object is to provide an improved method for manufacturing boron fiber, aluminum alloy composite structures at lower cost and at relatively higher production rates than has been possible heretofore using known methods and techniques.

Another object is to provide means for bonding boron fiber, aluminum alloy sheets by a molten metal fusion process wherein the molten metal in the joint is sufficiently thin so as to not allow the molten aluminum to contact the boron fibers.

Another object is to provide an improved method for fabricating relatively large and/or complex shaped fiber reinforced metal structures.

Another object is to provide a fiber reinforced metal alloy structure constructed by eutectically bonding together a plurality of fiber containing metal foils.

These and other objects and advantages of the present invention will become apparent after considering the following detailed specification which discloses several preferred embodiments or structures and several methods of making same in conjunction with the accompanying drawing, wherein:

FIG. 1 is a perspective view partially in cross-section showing a portion of a fiber reinforced sheet constructed according to the present invention;

FIG. 2 is a schematic view showing several sheets similar to the sheet of FIG. 1 being formed into a composite structure by an eutectic bonding process according to the present invention;

FIG. 3 is an enlarged view showing a fragment of another composite structure similar to the composite structure of FIG. 2 after the eutectic bonding process has been performed thereon;

FIG. 4 is an enlarged view showing a fragment of a composite structure after the eutectic bonding process has been performed thereon whose reinforcing fibers are oriented in various directions; and, FIG. 5 is a perspective view showing a portion of a composite structural member after the eutectic bonding process has been performed thereon, said member having portions of different thicknesses achieved by selectively placing monolayer fiber reinforced metal sheets.

Referring to the drawings more particularly by reference numbers, number 10 in FIG. 1 refers to a fiber reinforced sheet suitable for eutectically bonding to other similar sheets, and constructed according to the present invention. The sheet 10 includes a body portion formed of metal foil 12 which has a plurality of reinforcing fibers 14 running therethrough. The reinforcing fibers 14 ideally but not necessarily are arranged to be parallel to each other in the structure 10 and are formed in a single plane which is parallel to both opposite surfaces 16 and 18 of the foil 12. In order to get the most possible fiber material in the foil 12, it is preferable that the diameter of the fibers 14 be only slightly less than the thickness of the foil 12. Although the preferable parent or base metal of which the foil is constituted has been found to be relatively pure aluminum (1100 series aluminum or purer), the parent metal can also be an alloy of aluminum or any other metal which forms a liquid eutectic with some other material at a temperature below the melting point of the parent metal and of the reinforcing fibers 14. Relatively pure aluminum has been found to be particularly desirable, however, because it is relatively ductile and allows the intermediate sheets 10 constructed thereof to be easily formed even into relatively complex shapes. The reinforcing fibers 14 are preferably boron fibers which are formed by being grown around tungsten wires 20 as is relatively well known in the art. Boron fibers are known to work well in metal reinforcement applications because of their relatively high melting point, their low specific gravity and their high tensile strength and modulus although other fibers such as silicon carbide coated boron, graphite, beryllium, molybdenum, tungsten, tantalum, steel, wires, and similar materials can also be used especially in cases when other metals or alloys are used as the matrix. Where high temperatures will be encountered, typical matrices may be nickel, cobalt, titanium, iron, columbium, and other similar materials or their alloys.

A film 22 of bonding material is applied on one or both surfaces 16 and 18 of the foil 12 by any suitable method wherein the thickness thereof can be controlled as desired. Typical methods for applying the films 22 to the foil 12 have included vapor deposition and electrodeposition, both of which have advantageous features. It has also been found through experimentation that less care is required to apply a suitable bonding film 22 utilizing vapor deposition methods while electro-deposition may be faster and more economical in the long run. The bonding material from which the film 22 is constructed is chosen from those materials which form a liquid eutectic with the parent metal in the foil 12 at a temperature below the melting temperature of the reinforcing fibers 14. In addition, bonding materials which form high strength alloys with the parent metal are also usually preferable. In the case of the relatively pure aluminum foil 12 having boron fibers 14 therein as discussed above, a film 22 of a material such as copper works very satisfactorily because the aluminum-copper alloy which results after the eutectic bonding process is completed has a substantially greater strength than the original aluminum sheet alone, increasing as much as three-fold or more in strength. Also copper forms an eutectic with aluminum at temperatures between about 900°F and 1200°F which is below the temperature at which the aluminum melts. This is important because if the aluminum were permitted to melt, the boron fibers would then tend to undesirably be dissolved by or diffused into the aluminum thus destroying or substantially weakening the fibers 14 and weakening or ruining the resulting structure. Film forming materials other than copper which can also be used include silicon, silver, gold, tin, magnesium, manganese, and zinc to name a few. However, none of these seems to have all of the advantages and simplicity of copper.

It is desirable that the film 22 be relatively thin, having a thickness in a range between about $10^{-3}$ and $10^{-5}$ inches, so that undesirable, brittle intermetallic compounds are not formed at the interfaces between adjacent eutectically bonded sheets 10 since such brittle compounds when present substantially decrease the overall strength of the bonded structure and so that the molten zone will be thin and not contact the fibers 14. A thin bonding material film 22 is also desirable because very little of the bonding material is actually required to form an eutectic bond, and only relatively small amounts of bonding material need be diffused throughout the foil 12 to form alloys like the above mentioned aluminum-copper alloy. The thickness is normally set by the amount of bonding material required to form the alloy desired.

A typical apparatus in which to construct a fiber reinforced metal composite structure 24 (FIG. 3) using the teachings of the present invention is shown in FIG. 2 wherein similar sheets 10 are stacked one on the other on a mold 26, the surface of which preferably is separated from the sheets 10 with a suitable release agent. The number of sheets 10 stacked together to form the final structure can be varied widely as desired and the number and thickness of the sheets controls the final thickness of the completed structure. Although it is not mandatory it has been found that the outermost sheets numbered 10' in FIG. 2, which will form the exposed surfaces of the final structure 24 need have bonding material deposited only on the surfaces thereof that are to be bonded to adjacent sheets. Since the sheets 10 are relatively ductile when they are stacked, they can be easily conformed to the shape of a mold such as the mold 26 as shown in FIG. 2. A sealed chamber 28 is formed around the sheets 10 stacked on the mold 26 by welding or other suitable sealing methods of attaching metal foil 30 to the mold 26 in the position as shown. The pressure within the chamber 28 formed by the mold 26 and the foil 30 is dropped by means of a line 31 which connects the chamber 28 with a vacuum pump (not shown) which operates to remove air from the chamber 28 including particularly any air which might be between the stacked sheets 10 which otherwise might prevent a proper bond from being formed. Chambers such as this can be constructed from the relatively flexible stainless steel foils 30 and have been found to work well but other chambers or containers which can be evacuated such as might be formed by tightly sealed male and female molds can also be used. The sheets 10 are then heated to around 1000°F by suitable means such as by the electrical resistance heating cloths 32 and 34 which are shown positioned on opposite sides or around the chamber 28 as shown. Insulation means such as fiberglass cloth members 35 can be positioned about the chamber 28 and about the heating means 32 and 34 to assure that the heat that is produced is uniformly distributed to the sheets 10 being formed into the structure 24. A thermocouple 36 is included within the chamber 28 so that the temperature therein can be measured or monitored and regulated.

Pressure is applied to the sheets 10 during the bonding process and this pressure may be applied by some external means such as by placing the mold in a pressured chamber or autoclave 38. The pressure applied in this way should be in a range from about 15 to 1,000 psi. The pressure thus applied causes the sheets 10 to remain in intimate contact with each other and also assures that the sheets will closely conform to the shape and curves of the mold member 26. The pressure may be applied by placing the structure as shown in FIG. 2 in the autoclave 38 or it may be applied by any other suitable means such as by positioning the structure in an hydraulic pressure chamber or between the platens of an hydraulic press when tightly sealed male and female molds are used or the like. Such pressure applying means are important because they distribute their pressure uniformly over the structure being made and they also only require that a single mold member such as the member 26 be used rather than requiring mating mold members.

The subject process can also be performed without the use of an autoclave by placing the members or sheets to be bonded on a mold member such as the member 26 and moving a seam resistance or high frequency welder electrode back and forth over the exposed surface of the stacked sheets. If this is done it will usually not be necessary to provide a vacuum environment and the process can be performed in air because the movable electrode will then operate to force the sheets together as it moves thereover. Movable seam resistance and high frequency electrodes and welding processes are well known in the art. In this case that stationary mold member will also serve as the other welding electrode.

Since the sheets 10 are usually rather thin and flexible, they are relatively easy to conform to the shapes and curves of a mold such as the mold 26 especially if the principal mold curves or contours run parallel to the direction of the reinforcing fibers 14. The proper orientation of the fibers 14 in the stacked sheets 10 has a great deal to do with the ultimate strength and the modulus of elasticity of the completed structure 24. The fibers 14 are preferably located or arranged in a single layer or plane in each sheet 10, and therefore bending of one of the sheets 10 to make it conform to the shape of a contoured mold does not ordinarily exert nearly as much stress on the fibers 14 as would be the case if a single sheet had a plurality of layers of fibers especially if the fibers in the different layers were differently oriented. The net result is that when using sheets with single layers of fibers there is very little pre-stressing or degradation of the strength of the fibers 14 when conforming the sheets 10 to the mold. Also, if the fibers 14 are oriented parallel to the curves of the mold as is the case shown in FIG. 2, little or no degradation or weakening of the fibers seems to result. The orientation of the fibers in different bonded sheets 10, however, can be multi-directional. This is especially desirable if a completed structure 40, a fragment of which is shown in FIG. 4, will be subjected to loads in more than one direction. The fibers 14 can also be oriented unidirectionally, that is in only one direction, when forming parts such as spars which carry relatively great loads in certain predetermined directions and relatively small loads in other directions. Experimental unidirectional composite fiber reinforced structures similar to the structure 24 have been constructed having tensile strengths which vary by factors of as much as nine to one in different directions therein. It should be understood that the strength characteristics of the completed structures 24, 40 and 41 are varied by careful orientation and stacking of the sheets 10 and that the orientation of the sheets 10 does not otherwise effect the method of the construction of the structures 24, 40 and 41.

The sheets 10 when constructed of pure aluminum with copper layers 22, when heated are held at temperatures in the range from about 900 to 1200°F as aforesaid during which time the thin layers of bonding agent 22 diffuse into the metal 12 until the eutectic composition is reached and thin layers of liquid eutectic form between the sheets 10. The liquid eutectics form only between the adjacent sheets 10 and then only briefly because the bonding material quickly diffuses throughout the structure 24, 40 or 41. The thin layers of liquid eutectic therefore never come in contact with the fibers 14 even though the fibers 14 extend close to the coated surfaces of the foils 12. This is highly desirable especially in the case of boron-aluminum-copper structures because boron will be dissolved by and diffuse readily into the liquid aluminum-copper eutectic, if it comes in contact therewith, which dissolution of diffusion would undesirably weaken or destroy the fibers. The time required for the bonding material to diffuse may be as short as only a few minutes, such as five minutes, or longer in other cases depending on the materials and dimensions used. Alternatively, the diffusion of the bonding agent 22 into the parent metal 12 to form the desired homogeneous alloy can be completed in another heat treating operation thereby reducing the time to produce a structural member. After a length of time sufficient to allow complete diffusion of the bonding material into the matrix metal of the foil 12 to form the desired homogeneous alloy, the structure 24, 40 or 41 is allowed to cool. The pressure applied to the structure during bonding is then removed and the completed structure 24, 40 or 41 in its final form is removed from the autoclave 38 and from the chamber 28. As can be seen from the above explanation three separate operations take place at about the same time when the material is being bonded as follows, first the various sheets 10 are bonded together by the liquid eutectic phase to form a single integral structure reinforced with the fibers, secondly, a secondary forming operation may take place, and finally the strength of the parent metal is increased by the diffusion of the bonding material throughout.

Since boron fibers 14 are relatively lightweight and yet have high tensile strength and modulus characteristics, the combination thereof in a composite member or structure of aluminum-copper alloy results in structures 24, 40 and 41, which may have a tensile strength and modulus of elasticity approaching or exceeding that of high strength steel, but at about one-third the weight of the equivalent steel structure. It is therefore obvious that structures such as the structures 24, 40 and 41 are highly advantageous for use in aircraft and other applications where the strength-to-weight and modulus-to-weight ratios of the structural components may have a large effect on the overall efficiency and weight of the final construction. Also, since the bonding material diffuses throughout the structure, except for the fibers, the maximum temperature at which the structure can be used is not limited by the eutectic formation temperature because the proper percentages of the two materials to form the eutectic no longer exist anywhere in the completed structure 24, 40 or 41.

The following examples are offered to illustrate several possible embodiments of the invention in greater details, but it is not intended to restrict or limit the invention to the specific details of the examples since many variations are possible. The examples are therefore merely illustrative of the many possible variations that could be used.

EXAMPLE I

This example relates to forming a flat fiber reinforced composite structure which is 1 ½ inches square and is formed by eutectically bonding fiber reinforced aluminum members. Copper films approximately $6 \times 10^{-5}$ inch thick are vacuum deposited on boron fiber reinforced aluminum mono-layer sheets $5 \times 10^{-3}$ inch thick, which sheets are constructed of 1100 series aluminum previously cleaned by glow discharge means. Four of the copper coated reinforced sheets are stacked together on a steel tool coated with a suitable release agent which enables the finished member to be easily separated therefrom, and the stacked sheets are then placed into a stainless steel envelope similar to that shown in FIG. 2. The envelope is then welded shut to seal it and a vacuum of 750 mm. Hg. is drawn inside the envelope. The envelope with the sheets in it is then placed in an hydraulic press where a pressure of 15 psi is applied. At the same time, the temperature inside the envelope is raised to about 1030°F and is maintained for about fifteen minutes while the eutectic bonding and diffusion takes place. The bonded sheets are then cooled to 200°F, the pressure is removed, and the envelope reopened so that the completed structure can be removed. Photomicrograph analysis of a completed structure formed in this way determined that the structure was integral, that the copper bonding material diffused completely throughout the aluminum matrix to form a high strength alloy, and that the boron fibers therein were uneffected during the process thereby retaining their intrinsic mechanical properties.

EXAMPLE II

The same procedure is followed in Example II as for Example I except that twenty sheets are stacked instead of only four and all the sheets are oriented so their fibers are parallel in the structure. A pressure of 1,000 psi is then applied and the sheets are held at the elevated temperature for one hour after which the device is cooled and removed from the envelope. Again photomicrograph analysis shows that for a structure formed in this way, the sheets had been bonded into an integral structure, that the bonding material had diffused completely throughout the aluminum, and that the boron fibers were relatively uneffected by the bonding process.

EXAMPLE III

The same procedure is followed as in Example I except that three sheets are stacked on a male mold having a shape similar to that of the mold 26 shown in FIG. 2 with the fibers in all three sheets running in a direction parallel to the principal contours or bends of the mold. The sheets are held against each other and against the mold by a pressure of 700 psi which pressure is developed and maintained in an autoclave for twenty minutes at the elevated temperature. Photomicrograph analysis of a $2 \times 3 \times 10$ inch aircraft longeron composite structure constructed in this way shows that the structure is integral, that the resultant aluminum alloy is homogeneous throughout the structure, and that the boron fibers are relatively uneffected by the eutectic bonding process.

EXAMPLE IV

A flat fiber reinforced composite structure $0.022 \times 6 \times 16$ inches is formed by vacuum depositing $6 \times 10^{-5}$ inch thick copper film on mono-layer sheets formed of 1100 series aluminum $5 \times 10^{-3}$ inch thick and reinforced with boron fibers. The copper plated sheets are stacked on a steel tool coated with a release agent in such a way that all the sheets have their fibers oriented to extend in the same direction. The sheets are eutectically bonded together as in Example I using a bonding pressure of 100 psi and a bonding temperature of 1040°F in an autoclave. These conditions are maintained for fifteen minutes. Photomicrograph analysis of resulting structure shows that the sheets have been eutectically bonded into an integral structure, that the copper bonding material has diffused uniformly throughout the aluminum, and that the fibers are relatively uneffected by the bonding process. Tests of the composite structure showed that it had the following mechanical properties which clearly illustrate the effect of having all of the fibers extend in the same longitudinal direction:

| | |
|---|---|
| longitudinal flexural strength | = 260,000 psi |
| longitudinal tensile strength | = $170 \times 10^3$ psi |
| longitudinal modulus of elasticity | = $31 \times 10^6$ psi |

-continued

| | |
|---|---|
| transverse tensile strength | = 26 × 10³ psi |
| transverse modulus of elasticity | = 23 × 10⁶ psi |
| shear strength | = 26,500 psi |

Thus there has been shown and described several different embodiments of structural members and several methods of making same all according to the present invention including the construction of intermediate members used in the making of composite structures as well as the completed structures themselves and the methods of their manufacture, which members, structures and methods fulfill all of the objects and advantages sought for the present invention. Many changes, modifications, variations and other uses and applications of the subject structures and methods, however, will become apparent to those skilled in the art after considering this specification together with the accompanying drawing. All such changes, modifications, variations and other uses and applications which do not depart from the spirit and scope of the invention are deemed to be covered by the invention which is limited only by the claims which follow.

What is claimed is:

1. An aluminum alloy-boron fiber composite structure constructed by the method of stacking a plurality of similar foils in surface-to-surface relationship on a mold having the shape of the desired composite structure to be formed, each of said foils including a sheet of relatively ductile aluminum having a plurality of boron fibers distributed in a layer throughout, and each of said aluminum sheets having a coating on at least one surface thereof of copper capable of forming a liquid eutectic with the aluminum of the foil and of diffusing relatively uniformly throughout the aluminum without producing melting of any material, said foils being stacked on the mold so that at least one layer of said coating material is between each pair of adjacent foils in the stack, said composite structure being formed by subjecting said stacked foils under pressure to a predetermined temperature sufficient to form a liquid eutectic at the interfaces between the aluminum sheets and the coatings of material thereon, said predetermined temperature being greater than the eutectic temperature but less than the melting temperatures of the foils and the coatings thereon, said eutectic temperature being maintained for a sufficient time for the copper in the coating to diffuse substantially uniformly throughout the foil so as to lose its identity as a distinct coating and to integrally unite adjacent foils.

2. The alloy member defined in claim 1 wherein said fibers are oriented in a single layer in each of said sheets parallel to the coated surfaces thereof, said sheets to be bonded being oriented in the desired direction before being bonded together.

3. The alloy member defined in claim 1 wherein said alloy member has at least one curved portion, said sheets being oriented before being bonded such that the radii of curvature of the fibers at the curved portion are at least equal to the radius of curvature of the member itself at the curved portion.

* * * * *